US012600686B2

(12) United States Patent
Sugiyama et al.

(10) Patent No.: US 12,600,686 B2
(45) Date of Patent: Apr. 14, 2026

(54) CO2 RECYCLING METHOD AND SYSTEM

(71) Applicant: TOYOTA JIDOSHA KABUSHIKI KAISHA, Aichi-ken (JP)

(72) Inventors: Koseki Sugiyama, Sunto-gun (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 791 days.

(21) Appl. No.: 17/929,711

(22) Filed: Sep. 5, 2022

(65) Prior Publication Data

US 2023/0103019 A1     Mar. 30, 2023

(30) Foreign Application Priority Data

Sep. 15, 2021     (JP) ................................. 2021-150013

(51) Int. Cl.
| | |
|---|---|
| *B01D 53/62* | (2006.01) |
| *C01B 32/50* | (2017.01) |
| *C05D 9/00* | (2006.01) |
| *C10L 3/00* | (2006.01) |

(52) U.S. Cl.
CPC .............. *C05D 9/00* (2013.01); *B01D 53/62* (2013.01); *C01B 32/50* (2017.08); *C10L 3/00* (2013.01); *B01D 2257/504* (2013.01); *C10L 2200/0286* (2013.01)

(58) Field of Classification Search
None
See application file for complete search history.

(56) References Cited

U.S. PATENT DOCUMENTS

| | | | |
|---|---|---|---|
| 2011/0253550 A1 | 10/2011 | Hoffmann | |
| 2013/0104611 A1* | 5/2013 | Bauman ................... | C10G 2/32 |
| | | | 208/414 |
| 2021/0001266 A1 | 1/2021 | Sugiyama et al. | |

FOREIGN PATENT DOCUMENTS

| | | | | |
|---|---|---|---|---|
| CN | 101711180 A | | 5/2010 | |
| CN | 105377794 A | | 3/2016 | |
| CN | 214546341 | * | 11/2021 | |
| DE | 102008053334 A1 | | 7/2010 | |
| JP | 201135952 A | | 2/2011 | |
| JP | 20218852 A | | 1/2021 | |
| WO | 2008/144708 A1 | | 11/2008 | |
| WO | 2014190332 A1 | | 11/2014 | |
| WO | 2015042315 | * | 3/2015 | |
| WO | WO-2015042315 A1 * | | 3/2015 | ............. B01D 53/62 |

* cited by examiner

*Primary Examiner* — Sheng H Davis
(74) *Attorney, Agent, or Firm* — HAUPTMAN HAM, LLP

(57) ABSTRACT

A method and a system of properly utilizing $CO_2$ captured from the atmosphere as an agricultural fertilizer and a fuel for electric generation. The recycling method comprises: collecting information relating to demand for the $CO_2$ to be utilized as the fertilizer and demand for the $CO_2$ to be utilized as the fuel; calculating a ratio between an amount of the $CO_2$ to be utilized as the fertilizer and an amount of the $CO_2$ to be utilized as the fuel, based on the collected information; and thereafter utilizing the $CO_2$ as the fertilizer and as the fuel based on the calculated ratio.

4 Claims, 3 Drawing Sheets

CO2 RECYCLING METHOD AND SYSTEM

CROSS-REFERENCE TO RELATED APPLICATIONS

The present disclosure claims the benefit of Japanese Patent Application No. 2021-150013 filed on Sep. 15, 2021 with the Japanese Patent Office.

BACKGROUND

Field of the Invention

Embodiments of the present disclosure relate to the art of a method and a system of recycling $CO_2$ captured from the atmosphere.

Discussion of the Related Art

JP-A-2011-35952 describes an information processor for operating an electric power system including a plurality of generators. For example, the information processor described in JP-A-2011-35952 is applied to an electric power system having a plurality of generators including a generator equipped with a carbon dioxide capture and storage device (abbreviated as CCS device hereinafter). According to the teachings of JP-A-2011-35952, the information processor is configured to compute an operation schedule of each generator such that a fuel consumption and a $CO_2$ (i.e., greenhouse effect gas) emission are reduced, and that the number of the CCS devices to be operated is optimized.

According to the teachings of JP-A-2011-35952, therefore, the CCS devices may be operated in an optimal manner with respect to operating conditions of the generators so as to reduce the fuel consumption and the $CO_2$ emission. For example, the CCS device is adapted to capture $CO_2$ from air and exhaust gas utilizing an adsorption action of activated carbon and zeolite (i.e., by a physical adsorption). Instead, the CCS device may also be adapted to capture $CO_2$ from air and exhaust gas by adsorbing $CO_2$ to absorbing liquid such as amine (i.e., by a chemical adsorption). For example, the $CO_2$ captured by the CCS device may be stored in the ground or sea. Otherwise, the $CO_2$ captured by the CCS device may also be stored in a reservoir tank.

In order to utilize the $CO_2$ captured by the CCS device, it is necessary to develop a dedicated system. For example, the captured $CO_2$ may be utilized as an agricultural fertilizer to supply nutrients to plants, or as a fuel to generate a thermal energy. In a case of using the captured $CO_2$ as a fertilizer, a $CO_2$ concentration in an environment for crop growth is increased to promote photosynthesis of crops thereby increasing yield for crops. In this case, the $CO_2$ is immobilized in cells of the crops as a result of photosynthesis, and hence $CO_2$ emissions may be reduced. Whereas, $CO_2$ absorbed by algae may be utilized to create plant-based fuel. In this case, specifically, $CO_2$ is absorbed by algae from the atmosphere as a result of photosynthesis of algae, and hydrocarbon compounds are thus synthesized with cells of the algae. An oil content of the hydrocarbon compounds derived from the algae may be utilized to create the plant-based fuel containing chemical components and hydrocarbon compounds. For example, the plant-based fuel thus created may be used in a thermal energy plant to generate electricity. In this case, although $CO_2$ is emitted as a result of burning the plant-based fuel, such $CO_2$ has originally been collected from the atmosphere. That is, $CO_2$ in the atmosphere will not be increased. In addition, the $CO_2$ emitted from the thermal energy plant may be collected again to be utilized. Thus, the $CO_2$ may be circulated in a predetermined environment to reduce $CO_2$ emission.

As described, the $CO_2$ captured from the atmosphere may be utilized as an agricultural fertilizer and a fuel for generating electricity. Consequently, the $CO_2$ emission may be reduced to prevent the global warming. However, demand for the agricultural fertilizer and the fuel, that is, a required amount of the fertilizer and the fuel, and occasions where the fertilizer and the fuel are required are not always constant. For example, the demand for the agricultural fertilizer and the fuel vary according to the seasons or by time of the day. Therefore, it is not preferable to use the captured $CO_2$ as a fertilizer and a fuel by uniform standard irrespective of the demand and allocation.

SUMMARY

Aspects of embodiments of the present disclosure have been conceived noting the foregoing technical problems, and it is therefore an object of the present disclosure to provide a method and a system of properly utilizing $CO_2$ captured from the atmosphere as an agricultural fertilizer and a fuel for electric generation.

In order to achieve the above-explained objective, according to one aspect of the present disclosure, there is provided a recycling method of utilizing $CO_2$ captured from air as a fertilizer to supply nutrients to plants, and as a fuel to be burnt to generate thermal energy, comprising: collecting information relating to a demand for the $CO_2$ to be utilized as the fertilizer and a demand for the $CO_2$ to be utilized as the fuel; calculating a ratio between an amount of the $CO_2$ to be utilized as the fertilizer and an amount of the $CO_2$ to be utilized as the fuel based on the collected information; and thereafter utilizing the $CO_2$ as the fertilizer and as the fuel based on the calculated ratio.

In a non-limiting embodiment, the ratio between the amount of the $CO_2$ to be utilized as the fertilizer and the amount of the $CO_2$ to be utilized as the fuel may be calculated based on a planting area of a crop field to which the fertilizer derived from the $CO_2$ is delivered.

In a non-limiting embodiment, the ratio between the amount of the $CO_2$ to be utilized as the fertilizer and the amount of the $CO_2$ to be utilized as the fuel may be calculated based on a demand for an electric power to be generated utilizing the fuel derived from the $CO_2$.

In a non-limiting embodiment, the ratio between the amount of the $CO_2$ to be utilized as the fertilizer and the amount of the $CO_2$ to be utilized as the fuel may be calculated based on information about a season and a time of day in which at least one of the fertilizer and the fuel derived from the $CO_2$ is demanded.

According to another aspect of the present disclosure, there is provided a $CO_2$ recycling system that utilizes $CO_2$ captured from air as a fertilizer to supply nutrients to plants, and as a fuel to be burnt to generate thermal energy, comprising: a $CO_2$ capturing device that captures the $CO_2$ from air; and a $CO_2$ storage that stores the $CO_2$ captured by the $CO_2$ capturing device. In order to achieve the above-explained objective, according to another aspect of the present disclosure, the $CO_2$ recycling system is provided with a control unit that controls the $CO_2$ to be delivered from the $CO_2$ storage. Specifically, the control unit is configured to: collect information relating to a demand for the $CO_2$ to be utilized as the fertilizer and a demand for the $CO_2$ to be utilized as the fuel; calculate a ratio between an amount of the $CO_2$ to be utilized as the fertilizer and an amount of the CO2 to be utilized as the fuel based on the collected information; and utilize the CO2 as at least one of the fertilizer and the fuel based on the calculated ratio.

In a non-limiting embodiment, the control unit may be further configured to calculate the ratio between the amount of the CO2 to be utilized as the fertilizer and the amount of the CO2 to be utilized as the fuel based on a planting area of a crop field to which the fertilizer derived from the CO2 is delivered.

In a non-limiting embodiment, the control unit may be further configured to calculate the ratio between the amount of the CO2 to be utilized as the fertilizer and the amount of the CO2 to be utilized as the fuel based on a demand for an electric power to be generated utilizing the fuel derived from the CO2.

In a non-limiting embodiment, the control unit may be further configured to calculate the ratio between the amount of the CO2 to be utilized as the fertilizer and the amount of the CO2 to be utilized as the fuel based on information about a season and a time of day in which at least one of the fertilizer and the fuel derived from the CO2 is demanded.

Thus, according to the exemplary embodiment of the present disclosure, the CO2 captured by the CO2 capturing device from air (or exhaust gas) is utilized as a fertilizer and a fuel. The CO2 captured by the CO2 capturing device is temporarily stored in the CO2 storage tank, and distributed to the crop field and a CO2 recycling facility. The CO2 distributed to the crop field is utilized as a fertilizer to supply nutrients to plants, and the CO2 distributed to the CO2 recycling facility is recycled into fuel to be burnt e.g., in a thermal energy plant to generate thermal energy. According to the exemplary embodiment of the present disclosure, therefore, the CO2 captured in a predetermined area can be utilized appropriately to reduce CO2 emission from the predetermined area. Nonetheless, demand for the agricultural fertilizer and the fuel for electric generation vary according to the seasons or by time of the day. According to the exemplary embodiment of the present disclosure, therefore, the ratio between the amounts of the CO2 to be utilized as a fertilizer and to be utilized as a fuel is calculated taking account of the demand for the fertilizer and the fuel, and the CO2 is distributed to the crop field and the CO2 recycling facility based on the calculated ratio. The CO2 distributed to the CO2 recycling facility is recycled into fuel, and further delivered to e.g., the thermal energy plant to generate electric power.

For example, the distribution ratio of the captured CO2 to the crop field and to the CO2 recycling facility may be calculated based on the information relating to a planting area of a crop field to which the fertilizer derived from CO2 is delivered. In this case, therefore, a ratio of the CO2 distributed to the crop field may be increased when the planting area of the crop field increases in e.g., a planting season.

Otherwise, the distribution ratio of the captured CO2 to the crop field and to the CO2 recycling facility may be calculated based on the information relating to demand for an electric power to be generated utilizing the fuel derived from CO2. In this case, therefore, a ratio of the CO2 distributed to the CO2 recycling facility may be increased when the demand for an electric power is high.

Specifically, the distribution ratio of the captured CO2 to the crop field and to the CO2 recycling facility may be calculated based on the information relating to a season and a time of day in which at least one of the fertilizer and the fuel derived from CO2 is demanded. Therefore, at time of day when the crop field can be fertilized effectively, or in the season when the demand for the fertilizer increases, a ratio of the CO2 distributed to the crop field to be utilized as a fertilizer may be increased. Whereas, when a (forecast) temperature is extremely high or low, a ratio of the CO2 distributed to the CO2 recycling facility may be increased to generate more electric power by the thermal energy plant by burning the fuel derived from CO2.

Thus, according to the exemplary embodiment of the present disclosure, the CO2 captured in a predetermined area can be distributed in appropriate amounts to the sites in the predetermined area where the CO2 can be utilized. According to the exemplary embodiment of the present disclosure, therefore, an emission of CO2 as a greenhouse effect gas from the predetermined area can be reduced to prevent global warming.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

According to the exemplary embodiment of the present disclosure, there are provided a recycling method and a recycling system of capturing carbon dioxide (to be abbreviated as CO2 hereinafter) within a predetermined area such as a "smart city", and utilizing the captured CO2 as an agricultural fertilizer and a fuel for generating electricity. The definition of the smart city is defined by the Ministry of Land, Infrastructure, Transport and Tourism of the Japanese government, as a sustainable city or region where various problems are solved by improving management (e.g., planning, development, operation) while utilizing ICT (Information and Communication Technology). In the smart city, CO2 may be circulated within the smart city to reduce CO2 emission, by capturing $CO_2$ in the smart city and utilizing the captured CO2 as an agricultural fertilizer and a fuel for generating electricity.

Figure 1:
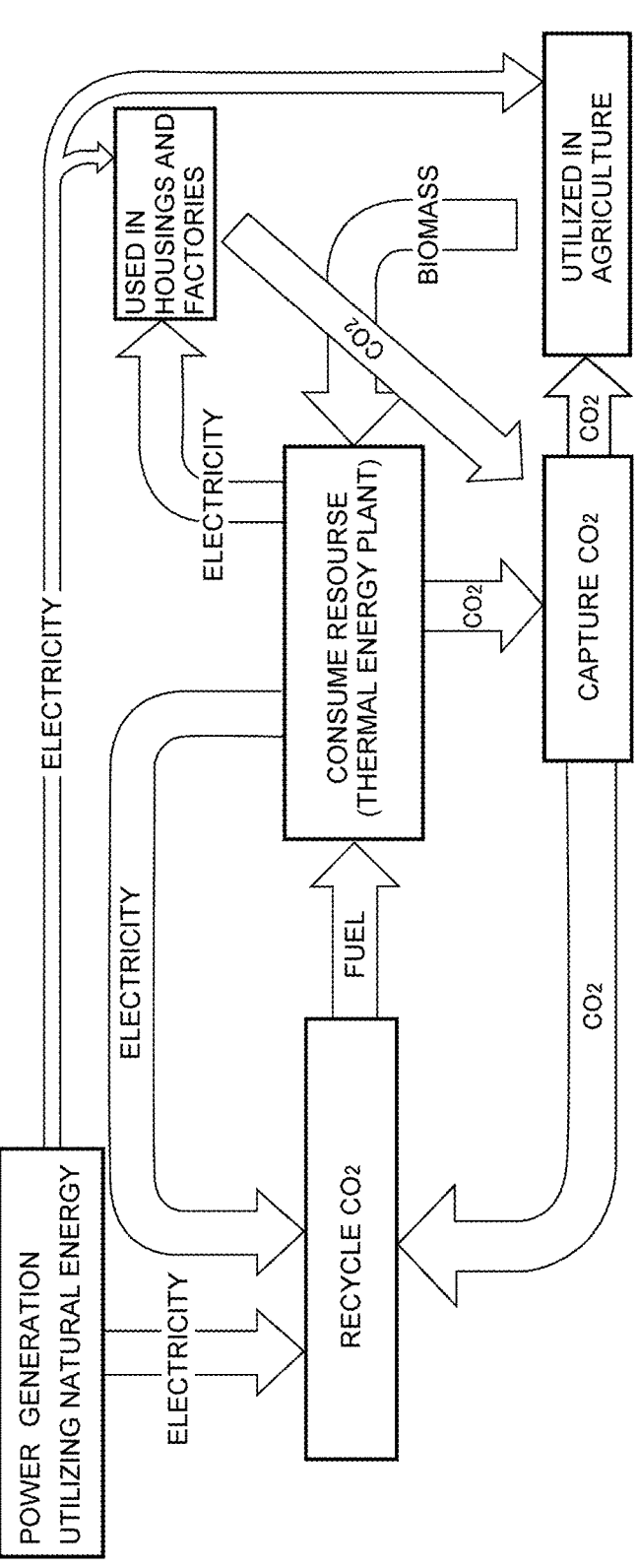
FIG. 1 is an explanatory drawing showing a circulation of CO2 within a smart city to which the method and the system according to the present disclosure is applied.

Turning now to FIG. 1, there is shown a scheme of circulating CO2 in the smart city by the recycling method and the recycling system according to the embodiment of the present disclosure. In the smart city, an electric power plant generates energy by consuming a natural resource while emitting CO2. In the example of the smart city shown in FIG. 1, specifically, a thermal energy plant generates electricity by burning a fuel such as a biomass fuel and a plant-based fuel. The electricity generated by the thermal energy plant is supplied to various kinds of buildings such as housings, shops, restaurants, factories, hospitals, warehouses, and a CO2 recycling facility as well.

In the smart city shown in FIG. 1, CO2 emitted from the thermal energy plant and the buildings is captured by a CO2 capturing device. For example, the above-mentioned CCS device may be adopted as the CO2 capturing device to capture CO2 from air and exhaust gas, and store the captured CO2 therein.

The CO2 captured by the CO2 capturing device is delivered to the CO2 recycling facility to be recycled. According to the exemplary embodiment of the present disclosure, specifically, the CO2 captured by the CO2 capturing device is recycled into fuel by the CO2 recycling facility, and the fuel derived from CO2 is supplied to the thermal energy plant to generate electricity. Thus, the CO2 captured in the smart city is utilized as the fuel in the smart city.

As described, in order to operate the CO2 recycling facility, the electricity generated by the thermal energy plant is supplied to the CO2 recycling facility. In addition, electricity generated utilizing natural energy and renewable energy, for example, electricity generated by wind or solar power is also supplied to the CO2 recycling facility. Such electricity generated by natural energy is also supplied to the buildings and crop fields in the smart city.

The CO2 captured by the CO2 capturing device may also be utilized in agriculture. Specifically, the CO2 captured in the smart city is utilized as a fertilizer to be delivered to the crop fields in the smart city to supply nutrients to plants.

Thus, in the smart city shown in FIG. 1, the CO2 captured by the CO2 capturing device is utilized mainly as a fuel and a fertilizer, and consumed in the smart city. That is, the CO2 is circulated within the smart city to substantially reduce CO2 emission.

Figure 2:
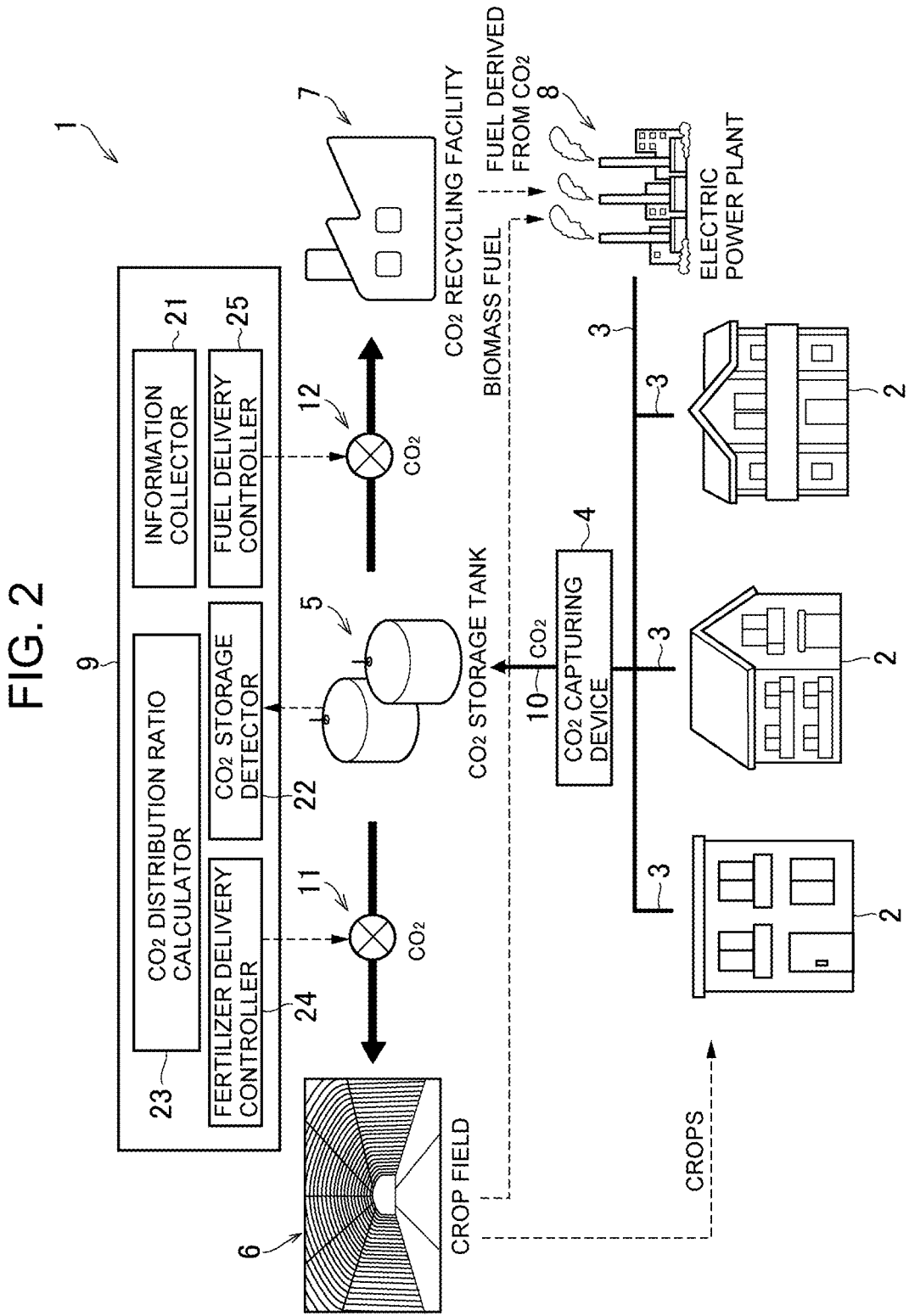
FIG. 2 is an illustrative drawing showing infrastructures of the smart city to which the method and the system according to the present disclosure is applied, and functions of a control unit of the system according to the present disclosure.

Turning to FIG. 2, there is shown a configuration of a CO2 recycling system 1 according to the exemplary embodiment of the present disclosure including a distribution channel of the captured CO2 and a distribution channel of the fuel derived from CO2. As illustrated in FIG. 2, in the CO2 recycling system 1, air and exhaust gas emitted from buildings 2 is delivered to a CO2 capturing device 4 through a flow path 3, and CO2 contained in the air and the exhaust gas is separated and captured by the CO2 capturing device 4. The CO2 captured by CO2 capturing device 4 is delivered to a CO2 storage tank 5. In FIG. 2, specifically, there is depicted an example to capture the CO2 emitted from the buildings 2 in the smart city including an electric power plant 8 intensively by the CO2 capturing device 4. As described, the CO2 captured by the CO2 capturing device 4 is utilized mainly as an agricultural fertilizer and a fuel for generating electricity. Specifically, the captured CO2 to be utilized as a fertilizer is delivered to a crop field 6. On the other hand, the captured CO2 to be utilized as a fuel is recycled into a fuel by a CO2 recycling facility 7, and delivered to the electric power plant 8. In order to control a delivery amount, a usage, a distribution ratio, etc. of the CO2 stored in the CO2 storage tank 5, the CO2 recycling system 1 is provided with a control unit 9.

The buildings 2 includes a housing, a shop, a restaurant, a factory, a hospital, a warehouse and so on located in the smart city. For example, CO2 is emitted from a relatively small building 2 such as a housing, a shop, an office, or the like by breathing of occupants. In addition, CO2 is also emitted from a heating equipment and a cooking appliance. Therefore, the CO2 recycling system 1 according to the exemplary embodiment of the present disclosure is configured to capture CO2 mainly from the buildings 2 of small or medium size. In addition, the CO2 recycling system 1 also collects CO2 from a relatively large building emitting a massive amount of CO2 such as the electric power plant 8, irrespective of whether the electric power plant 8 is located in the smart city or in the vicinity of the smart city.

Outlets (not shown) of the buildings 2 are individually connected to an inlet (not shown) of the CO2 capturing device 4 through the flow path 3 as a vent pipe so that air containing CO2 is delivered from the building 2 to the CO2 capturing device 4 through the flow path 3. In addition, the air and the gas emitted from the buildings 2 may also be transported to the CO2 capturing device 4 by other transportations such as automobiles (not shown) operated autonomously or driven by drivers in the smart city.

As described, the CO2 capturing device 4 captures CO2 from the air and the exhaust gas delivered thereto from the buildings 2 through the flow path 3. In addition, the CO2 capturing device 4 is adapted to communicate with the control unit 9 through dedicated communication lines or public communication lines (neither of which are shown) so that data can be exchanged between the CO2 capturing device 4 and the control unit 9.

For example, CO2 may be captured by the CO2 capturing device 4 utilizing principles of physical adsorption, physical absorption, chemical adsorption, and cryogenic distillation as disclosed in JP-A-2021-8852. Specifically, in a case of employing the physical adsorption method, CO2 is captured by contacting the exhaust gas to a solid adsorbent such as an activated carbon and zeolite, and then heating or depressurizing the solid adsorbent to desorb the CO2 from the solid adsorbent. In a case of employing the physical absorption method, CO2 is captured by contacting the exhaust gas to an absorbing liquid for dissolving the CO2 such as methanol and ethanol thereby physically absorbing the CO2 into the absorbing liquid under high pressure at a low temperature, and then heating or depressurizing the absorbing liquid to collect the CO2 from the absorbing liquid. In a case of employing the chemical adsorption method, CO2 is captured by contacting the exhaust gas to an absorbing liquid for selectively dissolving the CO2 such as amine thereby chemically absorbing the CO2 into the absorbing liquid, and then heating the absorbing liquid to collect the CO2 from the absorbing liquid. In a case of employing the cryogenic distillation method, CO2 is captured by compressing and cooling exhaust gas to liquidize CO2 contained therein, and selectively distilling the liquidized CO2 to collect the CO2.

The CO2 capturing device 4 is connected to the CO2 storage tank 5 through a flow path 10 so that the CO2 captured by the CO2 capturing device 4 is stored in the CO2 storage tank 5. Specifically, an outlet (not shown) of the CO2 capturing device 4 is connected to an inlet of the CO2 storage tank 5 through the flow path 10 as a piping so that the CO2 captured by the CO2 capturing device 4 is allowed to flow through the flow path 10 not only in the liquid phase but also in the gaseous phase depending on the capturing method. The CO2 storage tank 5 is also adapted to communicate with the control unit 9 through the dedicated communication lines or public communication lines (neither of which are shown) so that data can be exchanged between the CO2 storage tank 5 and the control unit 9. For example, data relating to a reserve of the CO2 and an available storage in the CO2 storage tank 5 are sent from the CO2 storage tank 5 to the control unit 9. If the available storage in the CO2 storage tank 5 is small, the control unit 9 restricts an entrance of the exhaust gas from the buildings 2 to the CO2 capturing device 4.

The CO2 stored in the CO2 storage tank 5 to be utilized as a fertilizer is delivered to the crop field 6 to fertilize the crop field 6. On the other hand, the CO2 stored in the CO2 storage tank 5 to be utilized as a fuel is delivered to the CO2 recycling facility 7 to be recycled into fuel, and the fuel derived from CO2 is further delivered to the electric power plant 8. In order to control CO2 supply from the CO2 storage tank 5 to the crop field 6, a flow rate regulator 11 is arranged in a pipeline (not shown) connecting the CO2 storage tank 5 to the crop field 6. Likewise, in order to control CO2 supply from the CO2 storage tank 5 to the CO2 recycling facility 7, a flow rate regulator 12 is arranged in a pipeline (not shown) connecting the CO2 storage tank 5 to the CO2 recycling facility 7.

For example, a valve mechanism such as a flow control valve and an on-off valve may be adopted as the flow rate regulators 11 and 12. In a case of employing the flow control valves as the flow rate regulators 11 and 12, a flow rate of the CO2 between the CO2 storage tank 5 and the crop field 6 and a flow rate of the CO2 between the CO2 storage tank 5 and the CO2 recycling facility 7 are regulated in accordance with opening degrees of the flow control valves. Whereas, in a case of employing the on-off valves as the flow rate regulators 11 and 12, a CO2 supply from the CO2 storage tank 5 to the crop field 6 and a CO2 supply from the CO2 storage tank 5 to the CO2 recycling facility 7 are selectively interrupted by switching positions of valve elements in the on-off valves. Instead, a blower may also be adopted as the flow rate regulators 11 and 12. In this case, the CO2 supply from the CO2 storage tank 5 to the crop field 6 or the CO2 recycling facility 7 is changed in accordance with a blast of wind created by the blower. The flow rate regulators 11 and 12 are also adapted to communicate with the control unit 9 through the dedicated communication lines or public communication lines (neither of which are shown) so that data can be exchanged between each of the flow rate regulators 11 and 12 and the control unit 9.

In addition, the CO2 stored in the CO2 storage tank 5 may also be transported to the crop field 6 and the CO2 recycling facility 7 by other transportations such as automobiles (not shown) operated autonomously or driven by drivers in the smart city.

In the CO2 recycling system 1 according to the exemplary embodiment of the present disclosure, the captured CO2 is delivered to the crop field 6 in the form of gaseous phase to be utilized as a fertilizer. Accordingly, the crop field 6 includes a greenhouse in which the crop field 6 can be fertilized effectively by the fertilizer derived from CO2, and an open-field in which e.g., a fertilizer spraying device is installed.

For example, the captured CO2 may be recycled into fuel by the CO2 recycling facility 7 utilizing photosynthesis of algae. Otherwise, the captured CO2 may also be recycled by other kinds of techniques. For example, the captured CO2 may also be recycled into liquid synfuel by synthesizing the captured CO2 with hydrogen. The CO2 recycled into fuel by the CO2 recycling facility 7 is supplied to the electric power plant 8. As an option, a fuel tank (not shown) may be arranged between the CO2 recycling facility 7 and the electric power plant 8 to temporarily store the fuel derived from CO2 in the fuel tank. The CO2 recycling facility 7 is also adapted to communicate with the control unit 9 through the dedicated communication lines or public communication lines (neither of which are shown) so that data can be exchanged between the CO2 recycling facility 7 and the control unit 9.

Specifically, the electric power plant 8 is a thermal energy plant that translates thermal energy into electric energy by burning the fuel derived from CO2. The electric power plant 8 is also adapted to communicate with the control unit 9 through the dedicated communication lines or public communication lines (neither of which are shown) so that data can be exchanged between the electric power plant 8 and the control unit 9. In addition, the CO2 recycled into fuel by the CO2 recycling facility 7 may also be supplied to an engine-driven generator that generates electricity by burning fuel. Further, the CO2 recycled into fuel by the CO2 recycling facility 7 may also be supplied to a hydro power plant and a nuclear power plant to generate electricity for operating those kinds of plants.

Specifically, the control unit 9 as a main controller of the CO2 recycling system 1 is an electronic control unit comprising a microcomputer or a server computer. For example, the control unit 9 controls the flow rate regulators 11 and 12 thereby regulating flow rates of CO2 delivered from the CO2 storage tank 5 to the crop field 6 and the CO2 recycling facility 7. The control unit 9 also controls operating conditions of the CO2 capturing device 4, the CO2 storage tank 5, the CO2 recycling facility 7, and the electric power plant 8. The control unit 9 is connected to an external server and websites on the internet through the dedicated communication lines or public communication lines (neither of which are shown). In addition, various kinds of data collected by detectors and sensors (neither of which are shown) are transmitted to the control unit 9.

The control unit 9 is configured to perform calculation based on the incident data and data and formulas stored therein, and to transmit calculation result in the form of command signal. For example, the control unit 9 transmits command signals to the flow rate regulators 11 and 12 so as to control opening degrees of the flow rate regulators 11 and 12 or to open or close the flow rate regulators 11 and 12. Otherwise, given that the blowers are employed as the flow rate regulators 11 and 12, the control unit 9 controls the winds created by the flow rate regulators 11 and 12. Consequently, amounts of the CO2 delivered from the CO2 storage tank 5 to the crop field 6 and the CO2 recycling facility 7 are adjusted to desired amounts.

Specifically, the control unit 9 comprises an information collector 21, a CO2 storage detector 22, a CO2 distribution ratio calculator 23, a fertilizer delivery controller 24, and a fuel delivery controller 25.

The information collector 21 collects various kinds of data to control the CO2 recycling system 1. Specifically, the information collector 21 collects data about demand for the fertilizer derived from CO2 and the fuel derived from CO2. For example, as to the demand for the fertilizer derived from CO2, the information collector 21 collects data about a planting area of the crop field 6, data about a maximum demand for the fertilizer to be delivered to the crop field 6, and data about a peak season at which demand for the fertilizer increases to the maximum demand. Whereas, as to the demand for the fuel derived from CO2, the information collector 21 collects data about a maximum demand for an electric power to be generated utilizing the fuel derived from CO2, and data about a peak season at which demand for the electric power increases to the maximum demand.

The CO2 storage detector 22 collects data about an amount of CO2 stored in the CO2 storage tank 5. For example, the CO2 storage detector 22 continuously collects data about a remaining quantity of CO2 in the CO2 storage tank 5, and computes an amount of CO2 possible to be delivered to the crop field 6 as a fertilizer and an amount of CO2 possible to be recycled into fuel by the CO2 recycling facility 7.

The CO2 distribution ratio calculator 23 computes a distribution ratio of the CO2 to the crop field 6 and to the CO2 recycling facility 7 based on the data collected by the information collector 21 and the CO2 storage detector 22. In other words, the CO2 distribution ratio calculator 23 computes an amount of CO2 to be delivered from the CO2 storage tank 5 to the crop field 6, and an amount of CO2 to be delivered from the CO2 storage tank 5 to the CO2 recycling facility 7.

The fertilizer delivery controller 24 controls the flow rate regulator 11 in such a manner as to deliver the CO2 to the crop field 6 in the amount computed by the CO2 distribution ratio calculator 23. Specifically, given that the valve mechanism is employed as the flow rate regulator 11, the fertilizer delivery controller 24 adjusts an opening degree of the flow rate regulator 11, or actuation of the flow rate regulator 11 based on the distribution ratio of the CO2 computed by the CO2 distribution ratio calculator 23. Otherwise, given that the blower is employed as the flow rate regulator 11, the fertilizer delivery controller 24 adjusts the wind created by the flow rate regulator 11 based on the distribution ratio of the CO2 computed by the CO2 distribution ratio calculator 23.

The fuel delivery controller 25 controls the flow rate regulator 12 in such a manner as to deliver the CO2 to the CO2 recycling facility 7 in the amount computed by the CO2 distribution ratio calculator 23. Specifically, given that the valve mechanism is employed as the flow rate regulator 12, the fuel delivery controller 25 adjusts an opening degree of the flow rate regulator 12, or actuation of the flow rate regulator 12 based on the distribution ratio of the CO2 computed by the CO2 distribution ratio calculator 23. Otherwise, given that the blower is employed as the flow rate regulator 12, the fuel delivery controller 25 adjusts the wind created by the flow rate regulator 12 based on the distribution ratio of the CO2 computed by the CO2 distribution ratio calculator 23.

Although only one control unit 9 is arranged in the CO2 recycling system 1 shown in FIG. 2, a plurality of control units may be arranged in the CO2 recycling system 1 to control each building and facility individually. As an option, each of the flow rate regulators 11 and 12 may be provided with its own dedicated computer (not shown). In this case, the control unit 9 includes those computers and a main server (not shown) installed on a predetermined site.

In addition, the CO2 capturing device 4 may be arranged in each of the buildings 2 in the smart city so as to capture CO2 individually from the exhaust gas emitted from the buildings 2.

Figure 3:
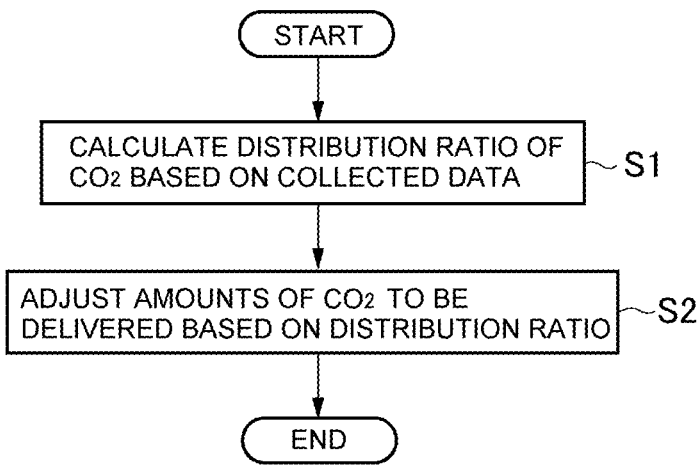
FIG. 3 is a flowchart showing one example of a routine executed by the control unit.

As described, the method and the system according to the exemplary embodiment of the present disclosure are configured to utilize the CO2 captured from the air and the exhaust gas as a fertilizer and a fuel at an appropriate ratio. For this purpose, the control unit 9 executes a routine shown in FIG. 3.

At step S1, an amount of the captured CO2 to be recycled into fuel and an amount of the captured CO2 to be utilized as a fertilizer are calculated based on the data collected by the control unit 9. To this end, data about the demand for the fertilizer derived from CO2 and the fuel derived from CO2 are collected. For example, as to the demand for the fertilizer derived from CO2, data about the demand for the fertilizer derived from CO2 and data about a peak season at which the demand for the fertilizer increases to the maximum demand are collected. On the other hand, as to the demand for the fuel derived from CO2, data about the demand for the fuel derived from CO2 and data about a peak season at which the demand for the fuel increases to the maximum demand are collected. Then, a ratio between the amount of the captured CO2 to be recycled into fuel and the amount of the captured CO2 to be utilized as a fertilizer is calculated based on the data relating to the demand for the fuel and the fertilizer derived from CO2.

Specifically, as to the demand for the fertilizer derived from CO2, data about a planting area (i.e., a cropping acreage) of the crop field 6 to which the fertilizer derived from CO2 is delivered is collected. Whereas, as to the demand for the fuel derived from CO2, data about the demand for an electric power to be generated utilizing the fuel derived from CO2 is collected. In addition, data about a season and a time of day in which at least one of the fertilizer and the fuel derived from CO2 is demanded is collected. Based on those collected data items, in the season when a planting area of the crop field 6 increases and hence the demand for the fertilizer derived from CO2 increases, a ratio of the CO2 distributed to the crop field 6 to be utilized as a fertilizer is increased. Whereas, in the season or at time of day when the demand for an electric power increases, a ratio of the CO2 distributed to the CO2 recycling facility 7 to be recycled into fuel is increased. Specifically, at time of day when the crop field 6 can be fertilized effectively, or in the season when the demand for the fertilizer increases, a ratio of the CO2 distributed to the crop field 6 to be utilized as a fertilizer is increased. Whereas, when a (forecast) temperature is extremely high or low, a ratio of the CO2 distributed to the CO2 recycling facility 7 is increased to generate more electric power by the electric power plant 8 by burning the fuel derived from CO2.

As described, the distribution ratio of the captured CO2 to the crop field 6 and to the CO2 recycling facility 7 is calculated based on the information relating to the demand for the fertilizer and the fuel. For example, such distribution ratio may be calculated based on empirical values and learned values using a pre-installed formula or with reference to a pre-installed map. Otherwise, such distribution ratio may also be calculated utilizing an artificial intelligence or big data.

Thus, at step S1, the information about the demand for the fertilizer and the fuel derived from CO2 is collected, and the distribution ratio of the collected CO2 to the crop field 6 and to the CO2 recycling facility 7 is calculated based on the information relating to the demand for the fertilizer and the fuel. Then, the routine progresses to step S2.

At step S2, actual amounts of the CO2 delivered to the crop field 6 and the CO2 recycling facility 7 are adjusted based on the distribution ratio calculated at step S1. Specifically, the flow rate regulator 11 arranged between the CO2 storage tank 5 and the crop field 6 is controlled so as to deliver the CO2 to the crop field 6 in the required amount based on the distribution ratio calculated at step S1. Likewise, the flow rate regulator 12 arranged between the CO2 storage tank 5 and the CO2 recycling facility 7 is controlled so as to deliver the CO2 to the CO2 recycling facility 7 in the required amount based on the distribution ratio calculated at step S1. Consequently, a required amount of the fertilizer derived from CO2 can be delivered to the crop field 6. Likewise, a required amount of the CO2 can be delivered to the CO2 recycling facility 7 to be recycled into fuel, and the fuel derived from CO2 is supplied from the CO2 recycling facility 7 to the electric power plant 8.

Thus, at step S2, the captured CO2 is distributed to the crop field 6 and the CO2 recycling facility 7 based on the distribution ratio calculated at step S1. Thereafter, the routine returns.

As has been explained above, according to the exemplary embodiment of the present disclosure, the ratio of the captured CO2 to be utilized as the agricultural fertilizer and the captured CO2 to be utilized as the fuel is calculate taking account of the demand for the fertilizer and the fuel. According to the exemplary embodiment of the present disclosure, therefore, a required amount of the fertilizer derived from CO2 can be delivered to the crop field 6. Likewise, a required amount of the CO2 can be delivered to the CO2 recycling facility 7 to be recycled into fuel, and the fuel derived from CO2 is supplied from the CO2 recycling facility 7 to the electric power plant 8.

For these reasons, the CO2 captured in a predetermined area can be distributed in appropriate amounts to the sites in the predetermined area where the CO2 can be utilized. According to the exemplary embodiment of the present disclosure, therefore, an emission of CO2 as a greenhouse effect gas from the predetermined area can be reduced to prevent global warming.

What is claimed is:

1. A recycling method of utilizing CO2 captured from air as a fertilizer to supply nutrients to plants, and as a fuel to be burnt to generate thermal energy, comprising:

collecting information relating to a demand for the CO2 to be utilized as the fertilizer and a demand for the CO2 to be utilized as the fuel;

calculating a ratio between an amount of the CO2 to be utilized as the fertilizer and an amount of the CO2 to be utilized as the fuel based on the collected information; and thereafter utilizing the CO2 as the fertilizer and as the fuel based on the calculated ratio, wherein the ratio between the amount of the CO2 to be utilized as the fertilizer and the amount of the CO2 to be utilized as the fuel is calculated based on a demand for an electric power to be generated utilizing the fuel derived from the CO2.

2. The recycling method as claimed in claim 1, wherein the ratio between the amount of the CO2 to be utilized as the fertilizer and the amount of the CO2 to be utilized as the fuel is calculated based on information about a season and a time of day in which at least one of the fertilizer and the fuel derived from the CO2 is demanded.

3. A recycling method of utilizing CO2 captured from air as a fertilizer to supply nutrients to plants, and as a fuel to be burnt to generate thermal energy, comprising:

collecting information relating to a demand for the CO2 to be utilized as the fertilizer and a demand for the CO2 to be utilized as the fuel;

calculating a ratio between an amount of the CO2 to be utilized as the fertilizer and an amount of the CO2 to be utilized as the fuel based on the collected information; and thereafter utilizing the CO2 as the fertilizer and as the fuel based on the calculated ratio, wherein the ratio between the amount of the CO2 to be utilized as the fertilizer and the amount of the CO2 to be utilized as the fuel is calculated based on a planting area of a crop field to which the fertilizer derived from the CO2 is delivered, and the ratio between the amount of the CO2 to be utilized as the fertilizer and the amount of the CO2 to be utilized as the fuel is calculated based on a demand for an electric power to be generated utilizing the fuel derived from the CO2.

4. The recycling method as claimed in claim 2, wherein the ratio between the amount of the CO2 to be utilized as the fertilizer and the amount of the CO2 to be utilized as the fuel is calculated based on information about a season and a time of day in which at least one of the fertilizer and the fuel derived from the CO2 is demanded.

* * * * *